Patented Aug. 18, 1925.

1,550,589

UNITED STATES PATENT OFFICE.

OSKAR SPENGLER AND ALFRED THURM, OF DESSAU IN ANH, GERMANY, ASSIGNORS TO ACTIEN GESELLSCHAFT FÜR ANILIN FABRIKATION, OF BERLIN, GERMANY.

TANNING MATERIAL

No Drawing.   Application filed July 3, 1924.   Serial No. 724,166.

*To all whom it may concern:*

Be it known that we, OSKAR SPENGLER and ALFRED THURM, citizens of the German Republic, residing at Dessau in Anh, Germany, have invented certain new and useful Improvements in Tanning Materials, of which the following is a specification.

According to this invention by heating arylsulfochlorides with hydroxyaryl compounds at relatively high temperatures, for instance 160° C. and higher, in the absence of condensing agents and water condensation products are obtained which precipitate glue and are excellent tanning agents.

The condensation of the products named above occurs with evolution of hydrochloric acid. The products of reaction are in the dry pulverized shape dark hygroscopic powders which dissolve easily in water. According to the parent material used, tanning agents may be obtained which have properties similar to those of the natural tanning materials.

The following examples illustrate but do not limit the invention, the parts being by weight:

1. Heat together 24 parts of salicylic acid sulfochloride and 10 parts of phenol while stirring at 200° C. until the thin molten mass, which evolves hydrochloric acid has thickened and a sample dissolves clearly in water. The aqueous solution of the product percipitates glue; calf's skin prepared in the usual manner is transformed into a soft leather.

2. Heat together 24 parts of salicylic acid sulfochloride and 5.4 parts of hydroquinone while stirring at 170° C. until a sample dissolves clearly in water. The product has the same properties as the condensation product of example 1; it furnishes a soft white leather.

3. Heat together while stirring 24 parts of salicylic acid sulfochloride and 8 parts of salicylic acid 160° C. until a sample dissolves clearly in water. The product of reaction furnishes a soft white leather similar to that prepared with tannin.

4. Heat together a mixture of 24 parts of salicylic acid sulfochloride and 10.8 parts of 2-hydroxynaphthalene-3-carboxylic acid whilst stirring at 180° C. The yellow aqueous solution of the product transforms calf's skin into a yellowish brown leather.

5. 25 parts of meta-cresotinic acid (1-methyl-3-hydroxy benzene-4-carboxylic acid) sulfochloride and 12 parts of salicylic acid are heated together to 165° C. The clear aqueous solution of the product furnishes a white soft leather.

6. 30 parts of 2-hydroxynaphthalene-3-carboxylic acid sulfochloride are heated with 8 parts of salicylic acid at about 190–200° C. until a sample dissolves clearly in water. The brownish aqueous solution furnishes a brownish leather.

7. Salicylic acid sulfochloride is heated to a temperature at which its decomposition occurs. The product thus obtained dissolves clearly in water and gives a white soft leather.

8. A mixture containing equal proportions of toluenedisulfochloride and of salicylic acid is heated to 210 to 220° C. The product of reaction dissolves in hot water to a reddish yellow solution, which furnishes a reddish leather.

What we claim is,—

1. As new products tanning materials which in their dry pulverized form are dark hygroscopic powders readily soluble in water, said products being substantially identical with products obtainable by heating arylsulfochlorides with hydroxyaryl compounds at temperatures of at least 160° C. in the absence of condensing agents.

2. As new products tanning materials which in their dry pulverized form are dark hygroscopic powders readily soluble in water, said products being substantially identical with products obtainable by heating arylsulfochlorides with hydroxyphenyl compounds at temperatures of at least 160° C. in the absence of condensing agents.

3. As new products tanning materials which in their dry pulverized form are dark hygroscopic powders readily soluble in water, said products being substantially identical with products obtainable by heating arylsulfochlorides with phenol at temperatures of at least 160° C. in the absence of condensing agents.

4. As new products tanning materials which in their dry pulverized form are dark hygroscopic powders readily soluble in water, said products being substantially identical with products obtainable by heating hydroxy-arylsulfochlorides with hydroxyaryl compounds at temperatures of at least 160° C. in the absence of condensing agents.

5. As new products tanning materials which in their dry pulverized form are dark hygroscopic powders readily soluble in water, said products being substantially identical with products obtainable by heating hydroxy-arylsulfochlorides with hydroxyphenol compounds at temperatures of at least 160° C. in the absence of condensing agents.

6. As new products tanning materials which in their dry pulverized form are dark hygroscopic powders readily soluble in water, said products being substantially identical with products obtainable by heating hydroxy-arylsulfochlorides with phenol at temperatures of at least 160° C. in the absence of condensing agents.

7. As new products tanning materials which in their dry pulverized form are dark hygroscopic powders readily soluble in water said products being substantially identical with products obtainable by heating hydroxycarboxy-arylsulfochlorides with hydroxyaryl compounds at temperatures of at least 160° C. in the absence of condensing agents.

8. As new products tanning materials which in their dry pulverized form are dark hygroscopic powders readily soluble in water said products being substantially identical with products obtainable by heating hyroxycarboxy-arylsulfochlorides with hydroxyphenyl compounds at temperatures of at least 160° C. in the absence of condensing agents.

9. As new products tanning materials which in their dry pulverized form are dark hygroscopic powders readily soluble in water, said products being substantially identical with products obtainable by heating hydroxycarboxy-arylsulfochlorides with phenol at temperatures of at least 160° C. in the absence of condensing agents.

10. As new products tanning materials which in their dry pulverized form are dark hygroscopic powders readily soluble in water, said products being substantially identical with products obtainable by heating hydroxycarboxy-phenylsulfochlorides with hydroxyaryl compounds at temperatures of at least 160° C. in the absence of condensing agents.

11. As new products tanning materials which in their dry pulverized form are dark hygroscopic powders readily soluble in water, said products being substantially identical with products obtainable by heating hydroxycarboxy-phenylsulfochlorides with hydroxyphenyl compounds at temperatures of at least 160° C. in the absence of condensing agents.

12. As new products tanning materials which in their dry pulverized form are dark hygroscopic powders readily soluble in water, said products being substantially identical with products obtainable by heating hydroxycarboxy-phenylsulfochlorides with phenol at temperatures of at least 160° C. in the absence of condensing agents.

13. As new products tanning materials which in their dry pulverized form are dark hygroscopic powders readily soluble in water, said products being substantially identical with products obtainable by heating 1-hydroxy-2-carboxy-phenylsulfochlorides with hydroxyaryl compounds at temperatures of at least 160° C. in the absence of condensing agents.

14. As new products tanning materials which in their dry pulverized form are dark hygroscopic powders readily soluble in water, said products being substantially identical with products obtainable by heating 1-hydroxy-carboxy-phenylsulfochlorides with hydroxyphenyl compounds at temperatures of at least 160° C. in the absence of condensing agents.

15. As new products tanning materials which in their dry pulverized form are dark hygroscopic powders readily soluble in water said products being substantially identical with products obtainable by heating 1-hydroxy-2-carboxyphenylsulfochlorides with phenol at temperatures of at least 160° C. in the absence of condensing agents.

16. Process for the production of tanning materials which comprises heating arylsulfochlorides with hydroxyaryl compounds at temperatures of at least 160° C. in the absence of condensing agents and water.

In testimony whereof we affix our signatures.

OSKAR SPENGLER.
ALFRED THURM.